Patented May 18, 1926.

1,584,716

UNITED STATES PATENT OFFICE.

ABRAHAM S. BEHRMAN, OF CHICAGO, ILLINOIS, ASSIGNOR TO INTERNATIONAL FILTER CO., OF CHICAGO, ILLINOIS, A CORPORATION OF ILLINOIS.

ADSORBENT MATERIAL AND PROCESS OF MAKING SAME.

No Drawing.   Application filed October 1, 1924.   Serial No. 741,078.

This invention relates to materials having pronounced adsorptive properties and suitable for various technical uses such as the purification of fluids. Desirable characteristics of such materials include, in addition to their adsorptive capacities, a high resistance to disintegration, the capacity for permitting the removal of substances which are taken up, so as to capacitate them for reuse, and the retention of adsorptive capacity incident to such employment.

The general purpose of the present invention is the provision of a material of increased adsorptive capacity and a method whereby the same may be manufactured in commercial quantities and at low cost.

Another object is the provision of such a material having the requisite durability and capacity for rehabilitation and repeated use.

Other and further objects of the invention will be pointed out hereinafter, indicated in the appended claims, or obvious upon an understanding of the present disclosure.

The subject-matter of the present invention relates to the general class of materials known as silica gels, but is distinguished from materials of that class heretofore known, by a much greater adsorptive capacity of the material and certain advantages in the process of its manufacture, which will be explained hereinafter. Described generally, my improved process involves the production of a gel in the form of a hard, extremely porous granular material of metallo-silicate nature by the combining of reacting solutions of alkali metal silicates and amphoteric oxides in such proportions as to form a gel which will retain all of the products of the reaction, so that a solid product may be obtained by removal of the moisture by evaporation, thus leaving in the solid mass components which were soluble in the reaction liquor. Upon reduction of the dried material to the desired granular or comminuted form, it is subjected to a leaching which removes the soluble salts physically incorporated in it by its method of production, and then dried. The resulting product is a highly resistant material of very high adsorptive capacity.

I will illustrate the practice of the process by an example in which aqueous solutions of sodium silicate and aluminum sulphate are employed. It is to be understood, however, that this illustration is not to be regarded as definitive of the invention, as the desired result may be obtained by the use of other materials, as well as by their use in different proportions and other forms of solution. For example, the silica may be present in a colloidal condition, such as a colloidal solution of silicic acid obtained by adding to a solution of alkali metal silicate a quantity of acid in excess of that required to neutralize it. Likewise the solution of amphoteric oxide may be alklaline, as in sodium aluminate, or neutral, as in zinc sulphate or aluminum sulphate. Or, the solution of amphoteric oxide may be acid, with free mineral acid, a condition which may be utilized to obtain an increase in the proportion of silica in the end product. In general, it may be stated that in the use of solutions of a salt of an amphoteric metal and of an alkali metal silicate, the porosity of the product will be decreased, and its density increased as more of the alkali of the silicate is neutralized. Other things being equal, the greatest density is obtained when the reaction mass is actually acid to the methyl orange class of indicators.

Moreover, since the phenomenon of adsorption seems to be influenced by a loose sort of chemical combination, demonstrated as a preference or affinity between particular substances, it follows that specific adsorbents will be best suited for the taking up of particular substances. Thus a complex silicate like sodium aluminum silicate, containing an alkali oxide, is better suited for adsorption of certain acid vapors than would be simple or normal silicate such as aluminum silicate. For some purposes it may be advantageous to employ a solution containing salts of a plurality of metals, such as of both aluminum and iron.

As a simple example of the practice of the process, and one which may be carried on commercially to manufacture an adsorptive material of high capacity, take 75 liters of an aqueous solution of commercial aluminum sulphate containing approximately 95 grams per liter and 75 liters of an aqueous solution of commercial water glass which has been prepared from 21.3 kg. containing approximately 9 percent $Na_2O$ and 28.5 percent $SiO_2$ and cool the solutions separately to nearly 0° C. Thus cooled, the solutions are combined, as by mixing in an open container, with the mixing temperature about 5° C. This results in the almost immediate formation of a gel which occupies the entire volume of the reacting solutions and in which is incorporated all of their constituent materials. With the proportions as stated, this gel is slightly acid to methyl orange indicators. After the gel has set it is thoroughly dried at a moderate heat, preferably under 100° C., and best between 60° and 80° C. It may be broken up before drying, or it may be dried en masse, depending upon facilities or convenience. As a result of this drying, the mass shrinks considerably and tends to subdivide into small glassy particles, which are largely transparent. These may be further broken up or crushed, to reduce the product to the desired degree of fineness. After drying, and either before or after the final subdivision of the material, it is thoroughly washed or leached with a liquid effective to dissolve out and carry away the soluble salts formed incident to the reaction and retained in the gel incident to its formation and the drying thereof. After such washing, the particles consist essentially of hydrated aluminum silicate. They are very hard and glassy and exceedingly porous, the pores being ultramicroscopic. The material has an apparent gravimetric density of over 60 pounds per cubic foot.

The high adsorptive capacity of the material apparently is due to what I have referred to herein as its porosity. As a convenient method for determining, at least for purposes of relative measurement or comparison, this adsorptive capacity, I have employed the practice of wetting a weighed quantity of the thoroughly dried material with water, or other liquid, and determining the increase in weight due to the adsorption of the liquid by the material. As determined by this method, material made as described in the illustrative example given above, has been found to possess a capacity for taking up water to an amount between 30 and 35 percent of the dry weight of the material.

Variations of the procedure include substituting an acid for a portion of the aluminum sulphate to increase the proportion of silica in the gel. In this fashion, gels may be produced which have an adsorptive capacity for water approximating 50 to 55 percent of the dry weight of the material. These materials may be converted to adsorptive materials minus the base exchanging capacity, by heating to a temperature sufficient to dehydrate them and they retain a high degree of adsorptive capacity even after heating to temperature as high as 750° C. After use in the intended fashion to an extent such that its adsorptive capacity is satisfied, the material may be recapacitated by subjection to heat adequate to drive off the adsorbed substance.

What I claim is:

1. The method of making an adsorptive material which comprises mixing a solution of a salt of an amphoteric metal with a solution of an alkali metal silicate in such proportions and concentrations as to produce a gel which is acid to methyl orange indicators and which includes in its mass all of the substances of the solutions, then drying the gel and finally leaching it to remove the soluble constituents.

2. A silicate gel which in its dehydrated state has capacity for adsorption of water to an amount exceeding 50 percent of its dry weight.

3. A method of making a silicate gel which comprises mixing a solution of a salt of an amphoteric metal with a solution of an alkali metal silicate in such proportions and concentrations as to form a gel which includes all of the substances of the reaction mixture, then drying the gel, then leaching out the soluble reaction products, and finally dehydrating.

4. A method of making a silicate gel which comprises mixing a solution of a salt of an amphoteric metal with a solution of an alkali metal silicate and an acid in proportions and concentrations such as to form a gel which includes all of the substances of the reaction mixture, then drying the gel, then leaching out the soluble reaction products, and finally dehydrating.

In testimony whereof I have hereunto signed my name.

ABRAHAM S. BEHRMAN.